United States Patent [19]

Pavlak et al.

[11] 4,263,893

[45] Apr. 28, 1981

[54] SOLAR ENERGY COLLECTOR CONSTRUCTION

[75] Inventors: Alex Pavlak, Phoenixville; Paul M. L'Esperance, Valley Forge; Joseph F. Catelli, Hatboro, all of Pa.

[73] Assignee: Consuntrator, Inc., Valley Forge, Pa.

[21] Appl. No.: 948,250

[22] Filed: Oct. 3, 1978

[51] Int. Cl.³ .............................................. F24J 3/02
[52] U.S. Cl. ................................. 126/426; 126/438
[58] Field of Search ................. 126/338, 339, 426, 424

[56] References Cited

U.S. PATENT DOCUMENTS

| | | | |
|---|---|---|---|
| 3,841,738 | 10/1974 | Caplan | 126/271 |
| 4,002,499 | 1/1977 | Winston | 250/228 |
| 4,003,638 | 1/1977 | Winston | 126/271 |
| 4,024,852 | 5/1977 | L'Esperance | 126/270 |
| 4,138,994 | 2/1979 | Shipley | 126/424 |

*Primary Examiner*—Samuel Scott
*Assistant Examiner*—G. Anderson

*Attorney, Agent, or Firm*—Dann, Dorfman, Herrell and Skillman

[57] ABSTRACT

Solar energy collector construction wherein the collector is composed of a skeleton framework, preferably of I-beam configuration interconnected so that it may be folded into a compact configuration for storage and shipment and which may be erected and locked into expanded configuration at the erection site so as to provide a sturdy structure which is highly resistant to wind loading and yet is fully effective in operation and use. Another feature is the design and mounting of the reflective elements which permits the reflective elements to be replaced periodically as they become less efficient reflectors through exposure to the elements. An improved collector construction is disclosed wherein the absorber element is in the form of a plate having passages therein for the flow of heat exchange fluid therethrough, the absorber plate being mounted within an enclosed light- and radiant-energy-transparent envelope which minimizes loss of heat from the absorber element by convection and conduction.

22 Claims, 16 Drawing Figures

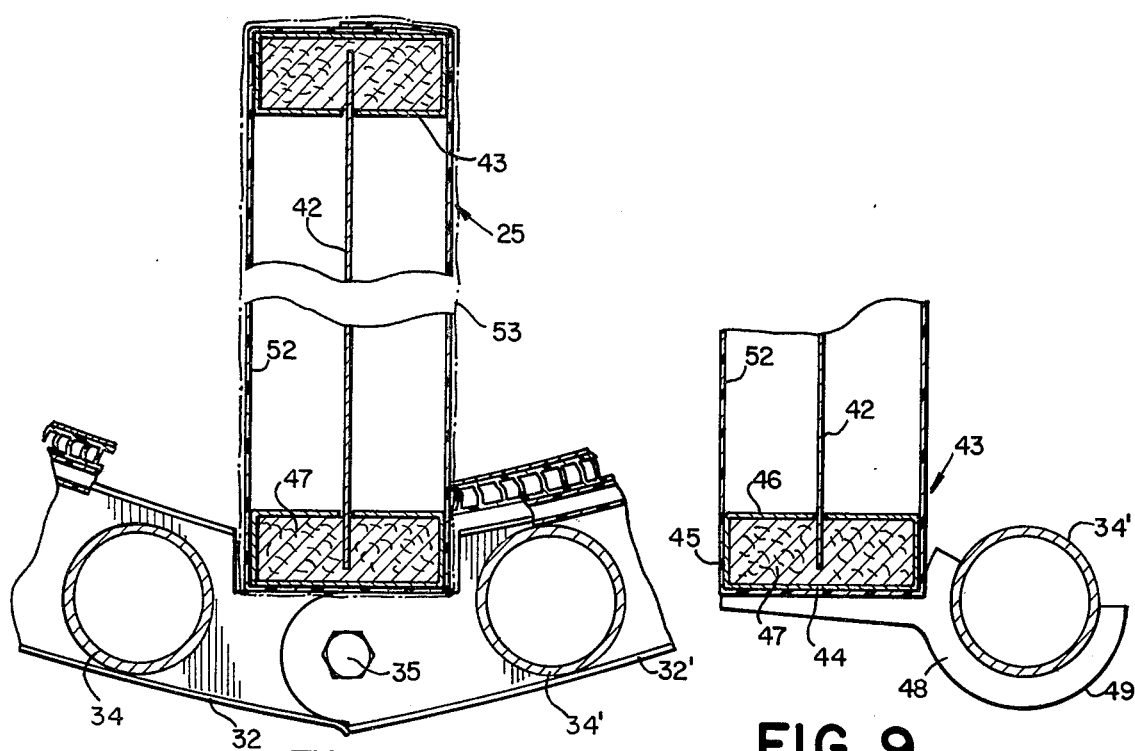
FIG. 8
FIG. 9
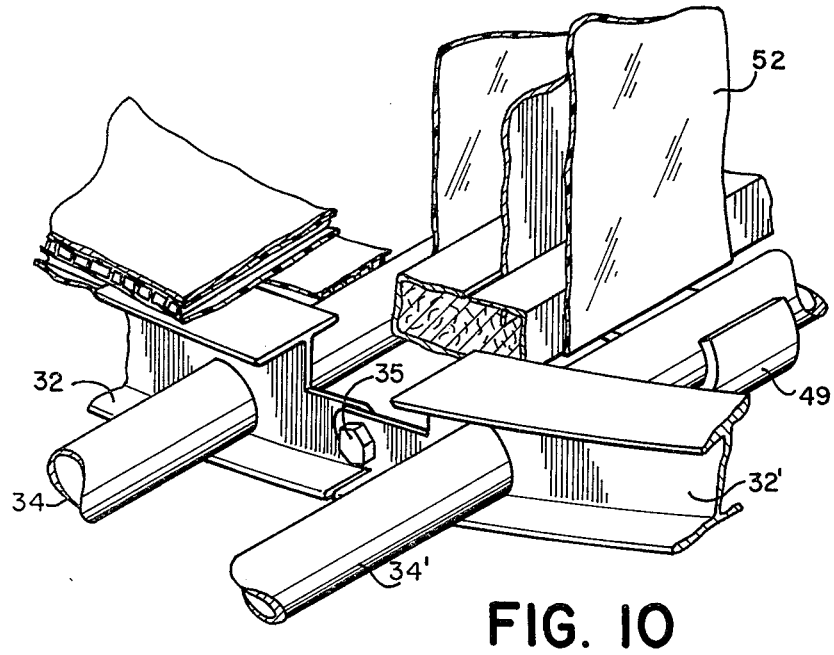
FIG. 10

SOLAR ENERGY COLLECTOR CONSTRUCTION

The present invention relates to solar-energy collectors and relates to an improved construction for collectors of the type shown in our earlier U.S. Pat. No. 4,024,852.

Prior to the present invention, concentrating solar energy collectors have not been commercially feasible due to the high cost of manufacturing and erecting the reflector and the collector. The efficiency of concentrating collectors is dependent to a large degree upon providing a sufficiently small absorbing surface relative to the collection area to render the normal conductive and convective losses to be a sufficiently small fraction of the total energy collected. In this regard, the specific efficiency of the present device is not substantially different from tracking concentrators at temperatures near 250°.

The major contributing factor to the improved cost effectiveness of the present device is in the ability of the device to collect energy throughout each successive season without the need for adjusting the collector to track the sun or provide other adjustments to accommodate to the changing elevation of the sun as each season progresses. As described in the aforesaid U.S. patent, the collector is mounted in a generally semi-tubular trough having parabolic sidewalls with a common focal point but with their parabolic axes disposed at an angle to one another. This construction permits a collection of radiant energy by a collector plate of substantially less than one-half the width of the aperture between the sidewalls, preferably approximately one-quarter of the aperture width. Prior collectors of the reflective type have been constructed of a permanent type of construction so as to enable the structure to withstand heavy wind loads, harsh weather conditions, and the like.

The present invention, on the other hand, is constructed of lightweight materials which have sufficient strength and rigidity to withstand the heavy wind loads and the harsh weather conditions. However, the reflective surface is not of a permanent type and may be readily replaced in the event of damage due to extreme conditions, or prolonged use.

Likewise, the construction of the present invention permits the replacement of the reflective surfaces so that the materials used in creating the reflective surfaces need not be completely resistant to weathering, but may be subject to deterioration after extended periods of use since the deteriorated materials may be readily exchanged for fresh materials.

Another object of the invention is to provide an arrangement which takes advantage of the structural strength of modern materials of the type used not only in building construction but also of the type used in packaging in which the strength of the packaging material is used to good advantage to provide a utilitarian structure at relatively low cost.

Still another object of the invention is to provide a structural unit which may be folded into a compact package for assembly at the factory and subsequent extension and erection at the installation site, the size of the package being of a character which will permit it to be transported in the most economical modes of freight.

Still another object of the present invention is to provide an assembly in which the collector is designed to accept the maximum amount of solar energy and to convert the same into useful energy without substantial loss of energy to the supporting structure by convection and conduction.

All of the objects of the invention are more fully set forth hereinafter with reference to the accompanying drawing, wherein:

FIG. 8 is a fragmentary sectional view taken on the line 8—8 of FIG. 4 illustrating the absorber assembly of the unit and the structure at the junction of the opposed sidewalls of the reflector component;

FIG. 9 is a fragmentary sectional view taken on the line 9—9 of FIG. 4 illustrating the support for the absorber assembly of the present invention;

FIG. 10 is a fragmentary perspective view with portions broken away illustrating the parts shown in FIGS. 8 and 9;

Figure 1:
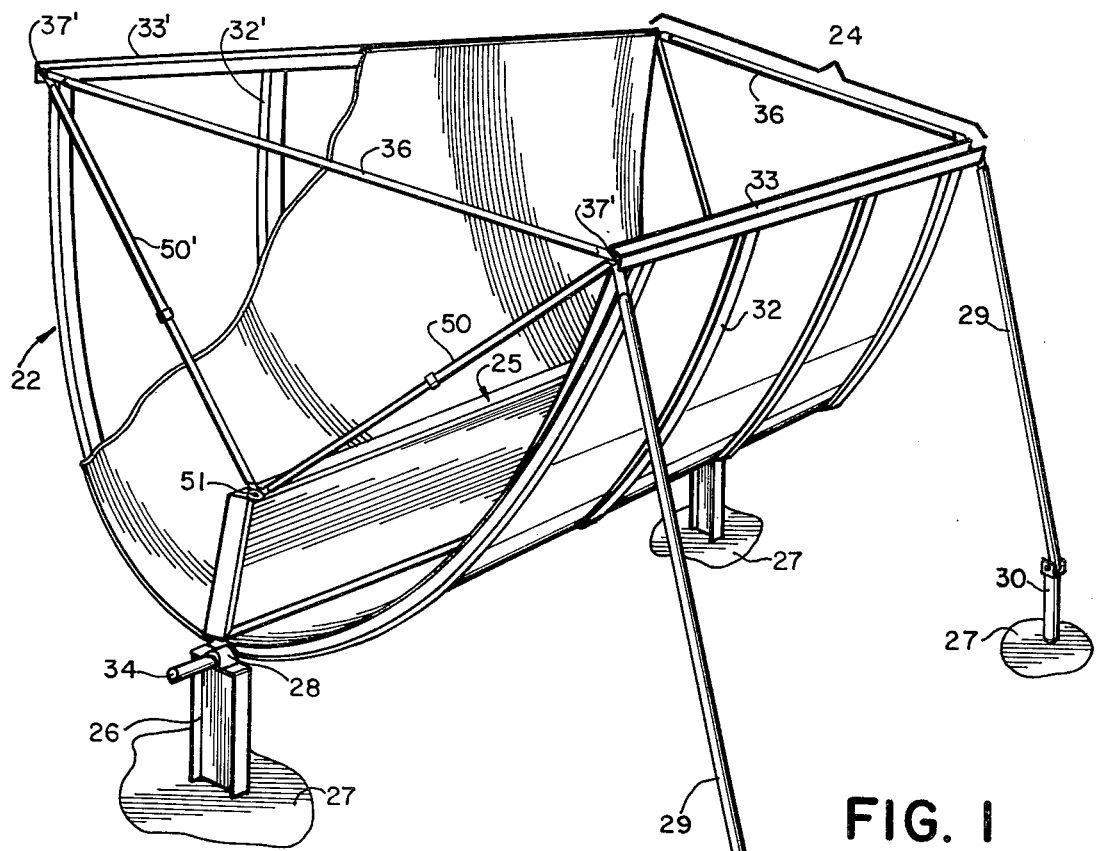
FIG. 1 is a perspective view of a solar energy collector assembly embodying the present invention and set-up for the summer season.
Figure 3:
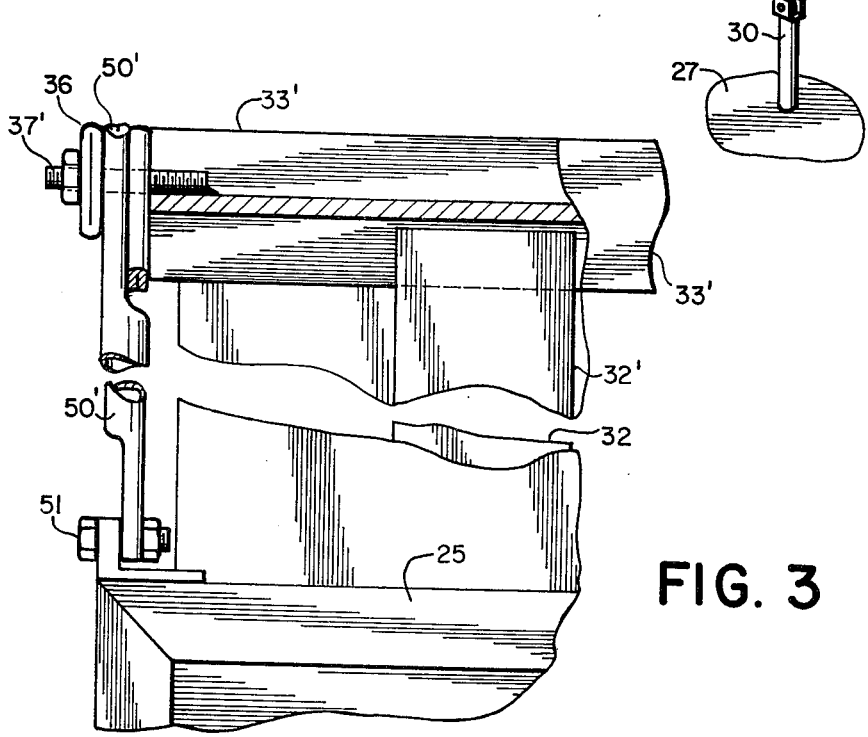
FIG. 3 (sheet 1) is a fragmentary sectional view with a mid portion broken away taken on the line 3—3 of FIG. 2.

Referring to the drawings, the collector of the present invention is designed to be mounted on the ground or other suitable firm foundation. For ease of manufacturing assembly with optimum operating efficiency, it is contemplated that the unit of the present invention will have a height on the order of eight feet above its foundation, an overall width of similar magnitude and a length in the longitudinal direction on the order of eight feet. As shown in the drawing, the unit comprises an open-ended elongated semi-tubular structure having a skeleton framework 22 to support an elongated semi-tubular reflector 23 which is open at its top to define an aperture 24 for the reception of solar energy. At the base of the reflector within its walls, an absorber element 25 extends longitudinally throughout the length of the collector unit. The unit is supported by the framework 22, and the framework 22, in turn, is mounted on a pair of standards 26 which, in the present instance, project upwardly from the ground or other foundation 27 and are provided with journals 28 at their upper end to pivotally support the collector unit. The angular position of the collector unit on the pivotal journals 28 is determined by struts 29 which extend from the upper edge of the unit at one side of the aperture to suitable anchors 30 in the ground or other foundation.

Figure 15:
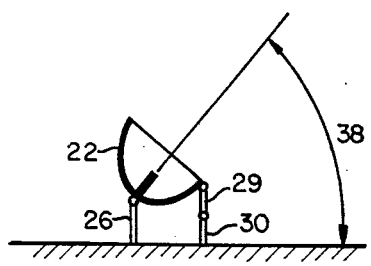
FIGS. 15 and 16 are thumbnail sketches in side elevation showing the collector in two positions respectively for summer and winter use at a North Latitude of 33°.
Figure 16:
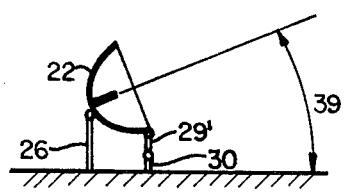

The collector unit of the present invention is designed to function efficiently without tracking the sun, and to this end, the unit is mounted so that the longitudinal axis of the unit parallels the east-west axis of the earth. The unit is symmetrical about its longitudinal center plane so that the righthand and lefthand components of the unit are substantially interchangeable. For maximum reception of solar energy during the summer months, before and after the summer solstice, the center plane of the collector should be tilted toward the equator at a steep angle relative to the horizontal plane and during the winter months, before and after the winter solstice, the center plane of the collector should be at a smaller angle to the horizontal. At the north 33° latitude, a collector with 36° total angular acceptance should be 75° to the horizontal during the summer, and the winter angle should be 39° to the horizontal. This is illustrated in FIGS. 15 and 16.

In accordance with the invention, the collector unit is fabricated and assembled at the factory and may be folded into a compact array for shipment to the erection site. At the erection site, the unit is unfolded and locked in its extended configuration so that it may be positioned with its aperture facing the sun, for example as shown in FIGS. 15 and 16.

As best shown in FIGS. 1-5 inclusive, the framework 22 is fabricated from structural members having a high strength-to-weight ratio. To this end, it is preferable to fabricate the framework from I-beams of aluminum or roll formed sheet metal with I-beam cross-section. The skeletal framework 22 comprises two side frames, each having a plurality of spaced parallel ribs 32 connected at their upper ends by a longitudinal stringer element 33 and along the base by a longitudinally-extending keel 34. In the present instance, the stringer 33 has an I-beam configuration whereas the keel 34 is a hollow, cylindrical tubular member extending along the length of the base. The stringer element 33 and keel element 34 are parallel to one another and combine with the ribs 32 to provide a framework upon which the reflective elements of the reflector are mounted. Although the right and lefthand side frames are identical, for the purpose of differentiation in the drawings, the corresponding parts in the lefthand side frame have been identified with primed reference numerals.

Figure 2:
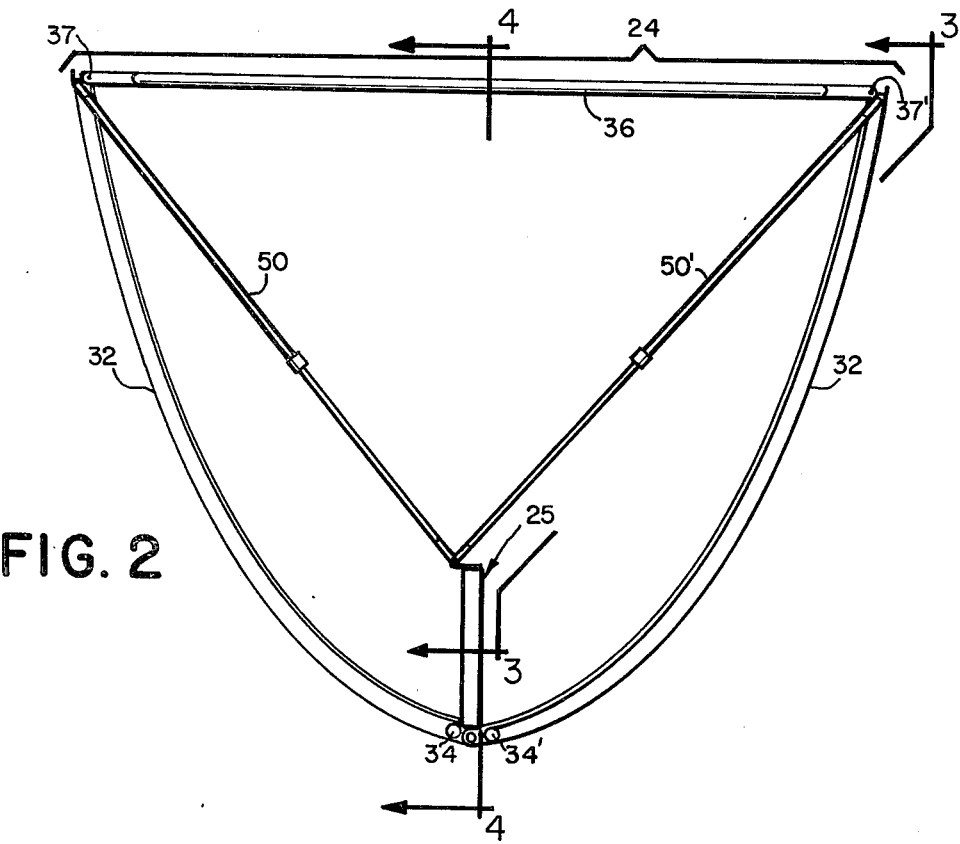
FIG. 2 (sheet 2) is an end elevation of the assembly as seen from the far end in FIG. 1.
Figure 4:
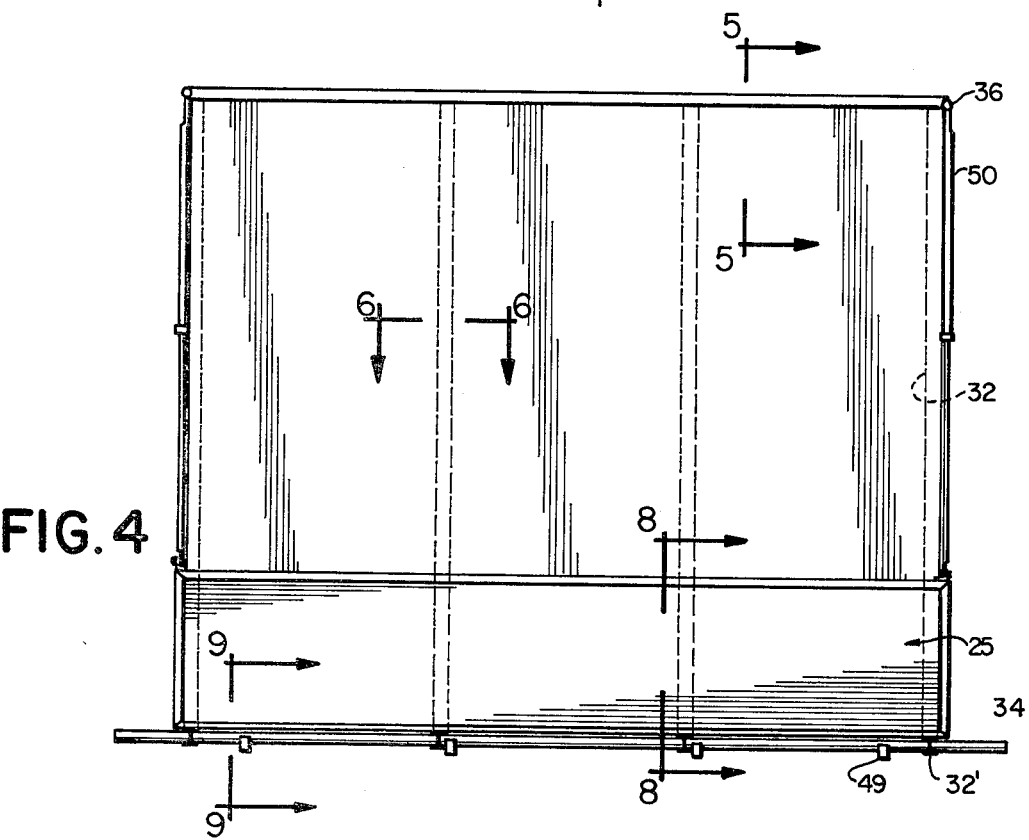
FIG. 4 (sheet 2) is a transverse sectional view taken on the line 4—4 of FIG. 2.

As shown in FIGS. 1 and 2, the ribs 32 in each side frame curve inwardly so that the sidewalls converge toward one another with a curvature which increases with the distance from the aperture 24 downwardly toward the base of the collector unit. As set forth more fully in our earlier U.S. Pat. No. 4,024,852, the curvature of the ribs and the side frame is semi-parabolic with the focal point of the parabolic surface coincident with the longitudinal center plane midway between the sidewalls. Each semi-parabolic surface defined by the ribs has its axis extending outwardly away from said center plane at a fixed angle and its apex adjacent the base of the unit, spaced from the center plane so that the parabolic surface does not intersect the center plane of the unit.

The two frame walls are interconnected along the base adjacent their respective keels, in the present instance by locking fasteners 35 (see FIG. 10) which pass through mating openings in the ribs 32 and 32' of the respective side frames. In the present instance, the locking fasteners 35 are nuts and bolts to permit the side frames to be separated from one another for folding the unit or for maintenance operations. At the top, the side frames are interconnected by cross braces 36 extending across the aperture 24 and connected to the ends of the stringers 33, for example by a threaded pin 37 projecting longitudinally from each end of the stringer. With the interconnection of the ribs 32 and 32' in the respective side frames by the fasteners 35 along the entire length of the base and by the cross braces 36 at the opposite ends of the aperture, the two side frames are united to form a rugged and sturdy structure capable of withstanding substantial loading and yet being of relatively light weight.

The cylindrical form of the tubular keel 34 affords ready pivotal adjustment of the framework angularly relative to the ground or other foundation 27. The cylindrical nature of the tubular keel 34 serves as an axle in the journals 28 to permit the framework 22 to pivot on the journals on the top of the standards 26. To angularly position the unit properly on the standards 26, the struts 29 extend from the pin 37 to the anchors 30. The strut 29 is adjusted as to length to insure the proper angular position of the unit. As discussed above, the unit may be positioned alternately between a summer position at a large angle to the horizontal or a winter position at a lower angle to the horizontal. This may be accomplished by providing an adjustment in the strut 29 which permits its being shortened to adjust the angular position of the collector unit, or, alternately, the strut may be replaced with a shorter strut as indicated at 29' in FIG. 16. In FIG. 15, the large tilt angle is indicated at 38, whereas in FIG. 16, the smaller tilt angle is indicated at 39.

The solar absorber of the present invention preferably embodies a flat-plate heat exchange element, preferably of the type wherein the heat exchanger consists of a pair of thin-walled conductive sheet elements mounted in face-to-face relationship with passages therebetween which permit the flow of a fluid heat-transfer medium therethrough. Such heat exchangers may be constructed in various forms which are readily available from various suppliers. In the drawings, the heat-exchanger plate is shown in edge view as a single plate 42. The plate 42 is supported about its entire periphery by C-shaped channel elements 43. As shown in FIGS. 8-10, each channel element 43 includes a base 44 having parallel side feet 45 extending perpendicularly therefrom and terminating in inturned toe portions 46 projecting toward one another from said feet and adapted to engage the opposite sides of said heat-exchange plate 42 in edge-to-face contact. The edge-to-face contact between the toe portions 46 and the plate 42 minimizes conductive heat transfer from the plate 42 to the C-shaped channel element 43, while the toe portions 46 limit the plate against transverse displacement.

The side framing elements for the plate 42 are similarly formed to provide a generally rectangular frame encircling the heat-exchange plate 42. The frame about the plate 42 is continuous except for the interruption necessary to permit connection of flow conduits to the passages of the heat-exchange plate 42. The frame provided by the members 43 is mounted at the base of the unit by brackets 48 mounted at spaced intervals along the length of the frame and projecting into encircling engagement with the tubular keel 34' as shown at 49 in FIG. 9. The mounting bracket 49 encircling the keel 34' permits limited pivotal movement of the absorber 25 when the unit is being folded for shipment. In use, however, the unit is designed to be positioned upright so that the plate 42 is coextensive with the longitudinal center plane of the unit. To anchor the absorber 25 in the unit, anchor struts 50 and 50' are pivoted to the absorber 25 at 51 and extend from the top channel member 43 angularly upward to the respective mounting pins 37 and 37' (see FIGS. 1 and 2). When anchored by the anchor rods 50 and 50', the plate 42 is disposed along the longitudinal center plane of the collector unit.

The C-shaped channel members forming the frame provide an enclosure in which loose insulation material may be confined. The insulation surrounds the edge portion of the plate 42 to minimize heat transfer from the plate to the channel elements 43. By using loose insulation material, the problem of vaporization of binders or other components of pre-formed insulators is avoided.

The frame provided by the channel elements 43 not only provides a firm structural support for the plate 42 and the loose insulation, but also facilitates the plate's being hermetically sealed against the atmosphere to provide an enclosed dead-air space to minimize conductive and/or convective losses. In the present instance, the hermetic seal is provided by a continuous film of a transparent polymer film 52 which is wrapped around the frame and hermetically sealed to itself along the top framing element as shown in FIG. 8. Preferably, the film is shrinkable to enable it to be fitted taut around the frame by heat shrinking. Such film may also stretch and contract to accommodate gaseous expansion and contraction within the sealed window frame due to temperature changes. The sealed encasement of the plate thus minimizes loss by convection by providing a stagnant air mass completely surrounding the plate, but also protects the plate against corrosive damage from atmospheric pollution and moisture and clouding of the film due to internal condensation. The polymer film is transparent to the solar energy collected through the aperture.

If other glazing is desired, it may be mounted directly on the foot portions of the channel elements 43 and sealed thereto. If the window frame is rigid and not susceptible to expansion, the enclosure must be vented to accommodate changes in temperature between daytime and nighttime operation. To avoid moisture contamination during the inflow of air as the enclosure is cooled, the vent should be provided with a dessicant or other drying device. It is desirable to render the vent self-regenerating so as to avoid the need for servicing the dessicant. To this end, the dessicant may be mounted in a carrier which is thermally coupled to the heat-exchange plate, so that during heating of the enclosure, when air is vented outwardly through the dessicant, the dessicant is heated by the plate to assist the regeneration of the dessicant.

This absorber construction has been found to be highly effective to maximize the transfer of solar energy to the heat-exchange plate 42. The concentration of heat which is provided by the parabolic contour of the reflector enables the plate to achieve substantially higher temperatures than are normally achieved with concentrating solar energy collectors. These higher temperatures cause a greater thermal differential in the materials of the collector element and the present construction allows the plate and the frame element to expand at different rates without causing mechanical stress due to such differential expansion. Preferably, the C-shaped channel members are fabricated of a bright metal which has highly reflective surfaces so that the radiant energy impinging upon the toe portions 46 of the channel elements 43 is operatively reflected onto the plate 42 thereby increasing the efficiency.

The efficiency of the unit is sufficiently great that it tends to convert solar energy into useful heat under even adverse conditions. Therefore, it is desirable to provide a means for effectively blocking the generation of sensible heat when it is undesired. To this end, Applicants have found that it is effective to provide a reflective opaque sheath, indicated in broken lines at 53 in FIG. 8, which encircles the frame provided by the channel members 43 and effectively reflects back the radiant energy from the heat-exchange plate 42.

The use of I-beams for the ribs 32 not only provides a high strength-to-weight ratio for the framework, but also permits the replaceable mounting on the framework of the reflective sheet material in a highly efficient and effective manner. In accordance with the invention, it is recognized that silvered glass mirrors provide long lasting, highly specular reflectors. However, the expense, weight, and fragile nature of such materials renders them uneconomical. By reason of the use of a reflector-collector of the nature set forth herein and described in our earlier U.S. Pat. No. 4,024,852, the highly specular reflective characteristics of the reflective surface are not as significant as they are with prior art collectors and, thus, it has been found suitable to utilize less expensive polymeric materials for the reflective surface of the unit. Such materials, however, may degrade over a period of time and gradually, particularly when exposed to atmospheric conditions, decrease in efficiency. Thus, it is desirable to provide a reflective surface which may be replaced periodically as the reflectivity of the material deteriorates with age.

The present invention accommodates itself to replacement of the reflective material by providing reflective sheet material which is mounted on the framework for removal and replacement.

Figure 7:
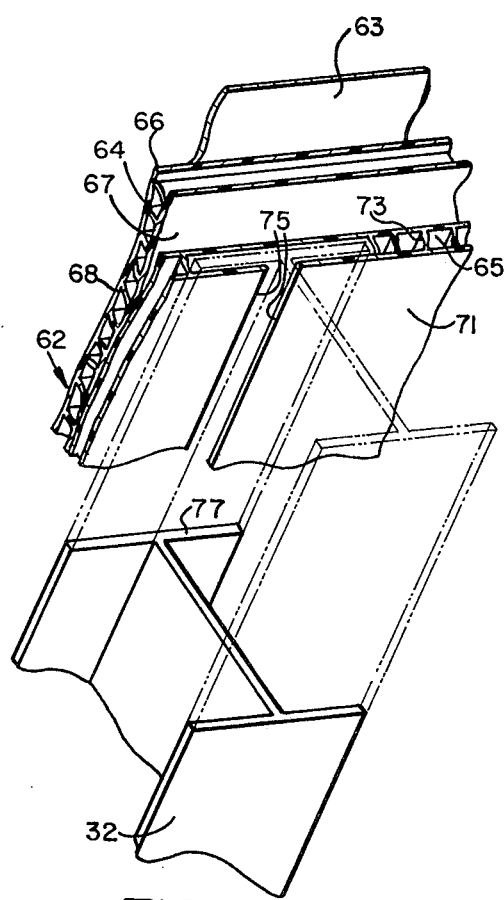
FIG. 7 is a fragmentary perspective view illustrating the construction of the reflective sidewall material with a structural framework member shown in broken lines to illustrate its relative interengagement therewith.
Figure 11:
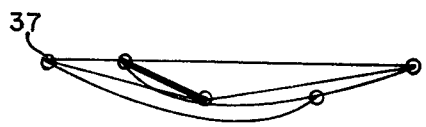
FIGS. 11, 12, 13 and 14 are diagrammatic views showing the unit of the present invention folded for storage and/or shipment and in successive stages of erection prior to erection to the position shown in FIG. 1.

The reflective sheet material embodied in the present invention is shown at 61 in FIG. 7 and comprises a substrate of a triple-face cross-laminated board 62 having bonded to the inner face thereof a reflective polymeric film 63. The substrate of the present invention is preferably composed of a synthetic resin which is sufficiently flexible to conform to the parabolic curvature of the ribs 32. As shown in FIG. 7, the substrate 62 of the present invention is, in the present instance, formed of two components identified as an inner component 64 and an outer component 65.

The inner component 64 has an inside face 66 and a center face layer 67 which are maintained in spaced parallel relation by partition elements 68 disposed edge-to-face lengthwise between the faces 66 and 67. As shown, the partitions 68 comprise parallel webs extending in the longitudinal direction of the collector unit parallel to the stringer 33 and the keel 34. The outer component 65 has an outer face 71, a center face layer 72 and intermediate partition elements which extend transverse to the partitions 68, in the present instance at right angles to the partitions 68 and parallel to the ribs 32. The center faces 72 and 67 are bonded together, for example by a cementitious bond or by fusion or other welding techniques so as to combine the two laminates into a unitary structure 62 having an inner face 66, a center face composed of the layers 67 and 72 and an outer face 71. Bonded to the inner face 66 is the reflective film 63. The components of this character may be extruded from suitable resin, for example polypropylene, in indeterminate lengths and in widths limited only by the width of the extrusion dye, thereby enabling highly economic production of the unit. The cross-laminated effect provided by the perpendicularly-oriented partitions 68 and 73 provides a high resistance against buckling and flexure of the sheets and provides a lightweight yet strong substrate. The orientation of the partitions parallel to the stringers 33 facilitates the flexing of the boards to conform to the curvature of the ribs 32 against which they are held, as described more fully below.

Figure 6:
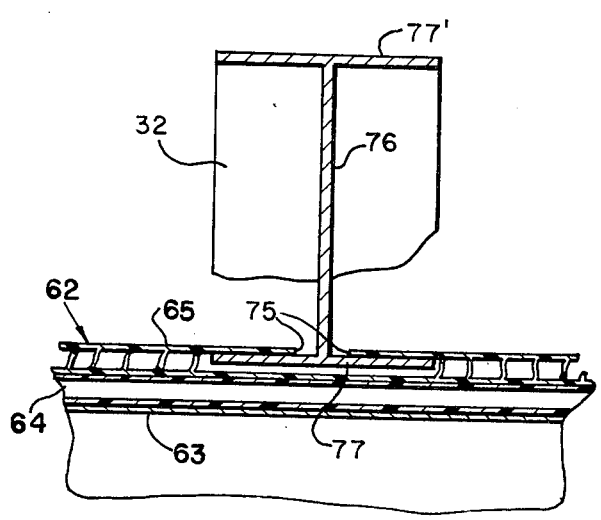
FIG. 6 is a sectional view taken on the line 6—6 of FIG. 4 illustrating the interengagement of the reflective sidewall member with the supporting skeletal framework.

The parallel disposition of the partitions 73 to the ribs 32 enables a novel interlock between the ribs 32 and the outer component 65 of the substrate. To this end, the outer face 71 of the component 65 is provided with a slot 75 extending parallel to the partitions 73 the full width of the composite sheet. Furthermore, the partitions 73 on both sides of the slot 75 are omitted so that the missing partitions and the slot 75 form a slot having a T-shaped cross-section, for example as illustrated in FIG. 6. The T-shaped slot extends from edge-to-edge of the sheet throughout its entire width and is parallel to the ribs 32. The I-beam configuration of the ribs 32 provides a central web 76 with flanges 77 and 77' at the opposite ends thereof. The inner flange 77, as shown in FIGS. 6 and 7, is able to slide in the T-shaped slot 75 to provide a slidable connection between the reflective sheet material and the rib. As indicated in FIG. 7, the sheet material may be engaged on the framework 22 by displacement longitudinally along the ribs 32 with the flange 77 engaged in the slot 75. The engagement of the flange in the slot affords a firm interengagement between the reflective sheet and the ribs in the nature of a cantilever, thereby serving to resist flexure or buckling of the sheet material between the ribs. The coplanar flat flanges of the adjacent ribs provide a solid support for the reflective sheet material which assists in resisting wind loading of the reflective sheet material when it is installed in normal operation position.

In the engagement of the reflective sheets 61 with the framework, the T-slots 75 of the sheets slide onto the flanges 77 of the ribs at the aperture side of the framework and the sheets are displaced downwardly toward the base, in a sliding movement. As the sheets travel on the curved surface of the ribs, they are deflected into a corresponding curved shape. Adjacent the base, as the curvature increases, there is a tendency for the sheets 61 to bow outwardly between the ribs. This tendency is overcome by the keel 34 which serves as a camming surface to engage the downwardly-moving lower edge of the sheet as it approaches its lowermost position at the bottom of the reflector. Thus, the keel element serves an additional function of providing an additional reinforcing support for the sheet element along the base of the reflector.

Figure 5:
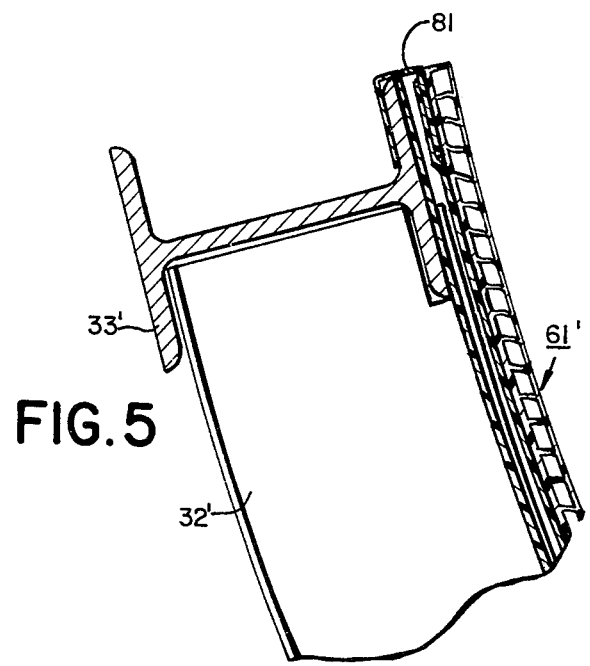
FIG. 5 (sheet 3) is an enlarged fragmentary sectional view illustrating the construction along the upper edge of the sidewall of the reflector shown in FIG. 1.

When the sheet is engaged in proper position, its lower edge is disposed closely adjacent the absorber 25 with a sufficient clearance to permit escape of rainwater or other moisture accumulation, and its upper edge is coextensive with the stringer 33. In order to assist in maintaining the sheet 61 flush against the stringer 33, a U-shaped channel clamp 81 engages the confronting flange of the stringer 33 and overlaps the upper edge of the reflective sheet 61 to firmly anchor it in place. As shown in FIG. 5, the edge portion of the reflective sheet 61 is provided with a slot by providing a separable bond between the center face layers 67 and 72 so that one leg of the channel element 81 may engage between these layers without covering the reflective film 63 on the exposed surface of the sheet 61 (see FIG. 5). If desired, the channel member 81 may be provided with a projecting lip to protect the exposed edge portion of the reflective sheet. Thus, by the foregoing arrangement, the reflective sheet is firmly mounted on the framework 22, but is readily displaceable therefrom for replacement and repair, for example, when the reflective character of the film 63 deteriorates.

Other means may be provided for anchoring the reflective sheet to the framework for replacement. For example, clips may be secured to the sheet material which are slidably engaged with the framework to permit releasable engagement therebetween, or other releasable fastening means may be provided. However, the aforedescribed method is preferred since it eliminates the need for separate elements which might become lost or damaged during assembly and might tend to corrode and deteriorate when exposed to the elements.

Although the reflective sheet material may be removed and replaced in situ, the manipulation of the sheets requires favorable weather conditions, such as the absence of any strong winds during the engagement with the ribs. Therefore, it is preferred to preassemble the sheets with the framework at the factory prior to shipment to the erection site. The aforedescribed construction of the collector assembly enables the unit to be folded into a reasonably compact package for shipment to the place of use, as shown diagrammatically in FIGS. 11-14. In these figures, the ribs 32 and 32' are shown as single lines. The keels 34 and 34' are shown as circles, and the pins 37 and 37' at the ends of the stringers 33 and 33' are shown as circles. To facilitate the folding of the unit as shown in FIGS. 11-14, the anchor struts 50 and 50' are formed as telescoping members so that they may be foreshortened during the folding operation and lengthened during the erection operation.

Figure 12:
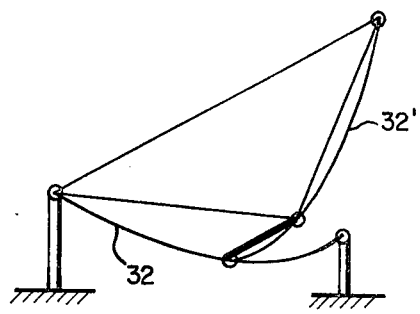
Figure 13:
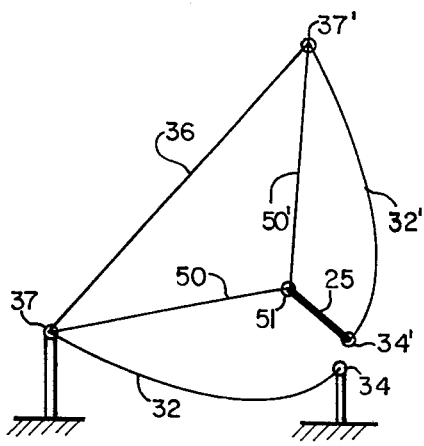
Figure 14:
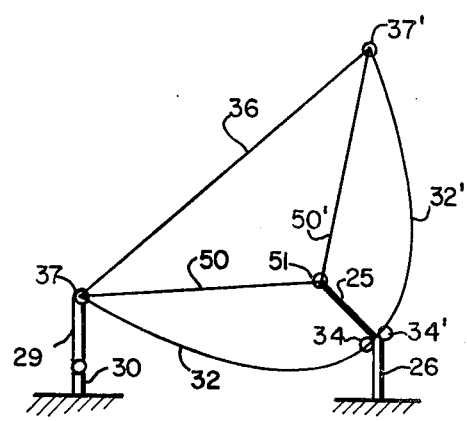

Starting with FIG. 14, which shows the unit erected on the standards 26 and anchor 30 by the strut 29, the ribs 32 and 32' are interlocked by the interlocking fasteners 35 (not shown in these figures). The first stage in folding the unit is to release the interlock provided by the fasteners 35 so that the ribs 32 are freed from the ribs 32'. The side of the framework embodying the ribs 32' may then be lifted free of the side embodying the ribs 32, as shown in FIG. 13. The ribs 32' may then be pivoted on the pin 37' to swing toward the cross brace 36. The anchor struts 50 and 50', during this pivotal movement, will cause the absorber 25 to pivot upwardly on the keel 34' against the reflective sheet material on the ribs 32', as shown in FIG. 12. The telescoping nature of the anchor struts 50 and 50' permits the absorber to lie close against the reflective sheet material on the ribs 32'. Further pivotal movement of the rib side 32' toward the cross brace 36 is accompanied by downward pivotal movement on the pin 37 so that the entire assembly may be folded to the compact arrangement shown in FIG. 11. The unit may be erected in the reverse manner as is apparent.

The folding of the unit to this compact arrangement enables the unit to be shipped in the most economical way without substantial loss of cargo space due to the bulkiness of the unit. The components of the unit are relatively lightweight so that restriction on shipping is due to bulk rather than to weight.

While a particular embodiment of the present invention has been herein illustrated and described, it is not intended to limit the invention to such disclosure, but changes and modifications may be made therein and thereto within the scope of the following claims.

We claim:

1. A solar energy collector comprising a skeleton framework, an elongated semi-tubular reflector means mounted on said framework, said means comprising reflective sheet elements forming two longitudinal sidewalls confronting each other with free upper edge portions defining between them an aperture for receiving the solar energy, said walls converging toward one another with a curvature increasing with the distance from said free edge portions, the marginal lower edge portions of said reflective elements forming a bottom wall along the base of said semi-tubular reflector, and a longitudinal absorber element disposed within said reflector adjacent said bottom wall to receive solar energy entering said aperture, said framework having parallel curved ribs corresponding to the curvature of said reflective elements, and junction means providing a slidable fit between said reflective elements and said ribs, said reflective elements being capable of flexing to permit slidable movement of said sheet elements along said ribs from said aperture toward said base.

2. A collector according to claim 1 wherein said ribs comprise structural members having web portions extending perpendicular to the reflective surface of said sheet elements and a flange portion parallel to said reflective surface, said sheet elements lying flush against said flange portions of said ribs so as to be rigidly supported thereby.

3. A collector according to claim 2 wherein said sheet elements are provided with slotted gripping portions engaging around said flange elements and slidable thereon to enable said flange element of each rib to serve as a guide on which said sheet elements are slidable.

4. A collector according to claim 3 wherein said framework includes a keel element for each side, said keel element extending longitudinally of said base to interconnect and reinforce said ribs, and comprising a cylindrical element passing through the web portions of each rib in closely spaced relation to said flange portions whereby the cylindrical surface of said keel element serves as a cam surface engaging the marginal lower edge portion of said reflective sheet to assist the flexing of said marginal edge portions to the maximum curvature at the base of said semi-tubular reflector.

5. A collector according to claim 4 including means mounting said collector on a foundation, said mounting means comprising standards aligned longitudinally of said collector, each having a journal pivotally supporting one of said cylindrical keel element to afford pivotal movement of said collector on said standards, and strut means extending from the foundation to the opposite ends of the ribs to anchor said collector at a given angular orientation on the pivotal axis provided by said one keel element.

6. A collector according to claim 5 wherein said strut is adjustable in length between at least two positions respectively disposing the aperture of said collector at small and large angles relative to horizontal plane.

7. A collector according to claim 1 wherein said reflective sheet elements comprise multi-ply laminar structures, comprising a board having at least inner, central and outer faces and a core of parallel spacer partitions between the center face and the outer face on one hand, and the center face and the inner face on the other hand, the partitions on the one hand being disposed perpendicular to the partitions on the other hand, the inner face having an exposed reflective surface.

8. A collector according to claim 7 wherein said center face comprises a first component layer formed integrally with said outer face and the spacer partitions between said center and outer faces, a second component layer formed integrally with said inner face and the spacer partitions between said center and inner faces, and bonding means intermediate said first and second layers operable to firmly bond said component layers together into a unitary structure.

9. A collector according to claim 7 wherein said reflective surface comprises a thin film of reflective material surface-bonded to said inner face.

10. A collector according to claim 9 wherein the spacer partitions between said inner face and said central face extend parallel to the upper and lower edge portions of said sheet element and the spacer partitions between said outer face and said central faces extend transversely intersecting said upper and lower edge portions.

11. A collector according to claim 10 wherein said outer face is interrupted between a selected pair of spacer partitions to provide a slotted opening extending between said upper and lower edges, the selected pair of spacer partitions being spaced away from the slotted opening to define a slot having a T-shaped cross section.

12. A collector according to claim 11 wherein each of said ribs comprises a web portion and flange portions slidable as a guide in said T-shaped slot.

13. A collector according to claim 1 wherein each of said sidewalls has a semi-parabolic interior reflective surface with its focal point coincident with the focal point of the other reflective surface on the longitudinal center plane midway between said sidewalls, each semi-parabolic surface having its axis extending outwardly away from said center plane at a fixed angle and its apex adjacent said base spaced from said center plane so that said parabolic surface does not intersect the center plane.

14. A solar energy collector comprising a skeleton framework, an elongated semi-tubular reflector means mounted on said framework, said means comprising reflective sheet elements forming two longitudinal sidewalls confronting each other with free edge portions defining between them an aperture for receiving the solar energy, said walls converging toward one another with curvature increasing with the distance from said free edge portions, the remote marginal edge portions of said reflective elements meeting to form a bottom wall along the base of said semi-tubular reflector, and a longitudinal collector element disposed within said reflector adjacent said bottom wall to receive solar energy entering said aperture, said framework having parallel curved ribs corresponding to the curvature of said reflective sheet elements, a keel element for each sidewall extending along the remote marginal edge interconnecting said ribs, a stringer element for each sidewall extending along the free edge portion interconnecting said ribs, said keel and stringer forming a non-skewing frame supporting said reflective sheet elements, locking means releasably interconnecting the frames along said bases, rigid cross-braces of a length corresponding to the width of said aperture and extending across said aperture between said stringers, and means pivotally connecting said cross braces at the opposite ends thereof to said stringers, whereby upon release of said locking means, said collector may be folded into a compact package by pivotal displacement of said side frames on said cross braces, and thereafter extended to the original configuration.

15. A collector according to claim 14, including mounting brackets for said collector, said brackets being pivoted coaxially to one of said frames and an elongated anchor member adjustably interconnecting said collector with at least one of the stringers to position said collector element on the longitudinal center plane between said sidewalls.

16. A solar energy collector according to claim 14, wherein, said collector element has a flat plate adjacent the longitudinal center plane midway between said reflective elements and translucent elements which are substantially transparent to solar energy disposed on opposite sides of said plate to shield said plate from the atmosphere between said reflective sheets, whereby said plate may receive solar energy entering said aperture both by direct impingement and by impingement of energy reflected from said sheet elements.

17. A collector according to claim 16 including a frame surrounding said collector plate and supporting said translucent elements, and wherein said translucent elements are hermetically sealed to exclude the atmosphere from said flat collector plate.

18. A collector according to claim 17 wherein each of said sidewalls has a semi-parabolic interior reflective surface with its focal point coincident with the focal point of the other reflective surface on the longitudinal center plane midway between said sidewalls, each semi-parabolic surface having its axis extending outwardly away from said center plane at a fixed angle and its apex adjacent said base spaced from said center plane so that said parabolic surface does not intersect the center plane, said collector including struts extending from said skeleton framework to said frame to position said frame so that said flat collector plate extends continuously from said focal point to said bottom wall.

19. A collector according to claim 17 comprising a removable opaque sheath enclosing the frame of said collector element to exclude reception of solar energy by said collector plate when said sheath is in place, said sheath having an energy reflective exterior to divert energy away from said plate.

20. A collector according to claim 14 wherein each of said sidewalls has a semi-parabolic interior reflective surface with its focal point coincident with the focal point of the other reflective surface on the longitudinal center plane midway between said sidewalls, each semi-parabolic surface having its axis extending outwardly away from said center plane at a fixed angle and its apex adjacent said base spaced from said center plane so that said parabolic surface does not intersect the center plane.

21. A solar energy collector comprising a skeleton framework, an elongated semi-tubular reflector means mounted on said framework, said means comprising reflective sheet elements forming two longitudinal sidewalls confronting each other with free edge portions defining between them an aperture for receiving the solar energy, said walls converging toward one another with curvature increasing with the distance from said free edge portions, the remote marginal edge portions of said reflective elements meeting to form a bottom wall along the base of said semi-tubular reflector, and a longitudinal collector element disposed within said reflector adjacent said bottom wall to receive solar energy entering said aperture, said framework having parallel curved ribs corresponding to the curvature of said reflective sheet elements, a keel element for each sidewall extending along the remote marginal edge interconnecting said ribs, a stringer element for each sidewall extending along the free edge portion interconnecting said ribs, said keel and stringer forming a non-skewing frame supporting said reflective sheet elements, said ribs and said stringers being elongated structural members having an I-beam cross section with a central web portion and a pair of spaced, parallel flange portions, the flange portions of said ribs having a curvature corresponding to the reflective sheets elements and interlocking with and providing cantilevered support for said sheet elements, the flange portion of each stringer underlying and disposed flush against a surface of the associated sheet element which is opposite the aforementioned reflective surface.

22. A collector according to claim 21 including a U-shaped channel member extending along the upper edge of said sheet elements, the U-shaped member having opposite legs, one disposed to engage the flange of the stringer and the other disposed to engage said sheet element to provide anti-flexure reinforcement for said edge, retaining it against the flange of the stringer.

* * * * *